(12) United States Patent
Zhang et al.

(10) Patent No.: US 9,664,496 B2
(45) Date of Patent: May 30, 2017

(54) CABLE LENGTH DETERMINATION USING VARIABLE-WIDTH PULSES

(71) Applicant: QUALCOMM INCORPORATED, San Diego, CA (US)

(72) Inventors: Yanyan Zhang, Shanghai (CN); Xiabing Liu, Shanghai (CN)

(73) Assignee: QUALCOMM Inc., San Diego, CA (US)

( * ) Notice: Subject to any disclaimer, the term of this patent is extended or adjusted under 35 U.S.C. 154(b) by 312 days.

(21) Appl. No.: 14/390,220

(22) PCT Filed: Nov. 30, 2012

(86) PCT No.: PCT/CN2012/085619
§ 371 (c)(1),
(2) Date: Oct. 2, 2014

(87) PCT Pub. No.: WO2013/163875
PCT Pub. Date: Nov. 7, 2013

(65) Prior Publication Data
US 2015/0054488 A1 Feb. 26, 2015

Related U.S. Application Data

(63) Continuation-in-part of application No. PCT/CN2012/074981, filed on May 2, 2012.

(51) Int. Cl.
*G01B 7/02* (2006.01)
*H04B 3/46* (2015.01)

(52) U.S. Cl.
CPC ........ *G01B 7/02* (2013.01); *H04B 3/46* (2013.01)

(58) Field of Classification Search
CPC .. G01B 7/02; G01B 7/026; H04B 3/46; H04L 12/2697; H04L 43/50; G01R 31/02;
(Continued)

(56) References Cited

U.S. PATENT DOCUMENTS 4,104,582 A * 8/1978 Lambertsen ........... G01R 31/11
324/533
5,159,275 A   10/1992 Fujimura
(Continued)

FOREIGN PATENT DOCUMENTS

CN     1080995 A    1/1994
CN   101873155 A   10/2010
(Continued)

OTHER PUBLICATIONS

International Search Report and Written Opinion—PCT/CN2012/074981—ISA/EPO—Feb. 7, 2013.
(Continued)

*Primary Examiner* — Huy Q Phan
*Assistant Examiner* — David Frederiksen
(74) *Attorney, Agent, or Firm* — Paradice and Li LLP (57) ABSTRACT

A method of determining the length of a cable coupled to a transceiver of a network device includes transmitting a first series of pulses of a first pulse width onto a cable, receiving reflections of the first series of pulses, transmitting a second series of pulses of a second pulse width onto the cable, and receiving reflections of the second series of pulses. The second pulse width is wider than the first pulse width. It is determined whether the reflections of the first series of pulses satisfy a criterion. The length of the cable is calculated using either the reflections of the first series of pulses or the reflections of the second series of pulses, based at least in part on whether the reflections of the first series of pulses satisfy the criterion.

18 Claims, 10 Drawing Sheets

(58) Field of Classification Search
CPC ............... G01R 31/021; G01R 31/08; G01R 31/083–31/086; G01R 31/11
See application file for complete search history.

(56) References Cited

U.S. PATENT DOCUMENTS

| | | | | |
|---|---|---|---|---|
| 5,805,202 | A * | 9/1998 | Mullins | H04N 7/18 348/143 |
| 6,771,076 | B1 | 8/2004 | Smith | |
| 7,358,745 | B1 * | 4/2008 | Lo | H04L 43/50 324/533 |
| 7,375,532 | B1 * | 5/2008 | Lo | H04B 3/46 324/533 |
| 7,688,749 | B1 * | 3/2010 | Lo | H04L 41/0806 370/252 |
| 7,808,249 | B1 | 10/2010 | Lo et al. | |
| 7,986,147 | B1 * | 7/2011 | Lo | G01R 31/021 324/533 |
| 2002/0105344 | A1 * | 8/2002 | Bohley | G01B 7/02 324/662 |
| 2003/0222654 | A1 | 12/2003 | Furse et al. | |
| 2006/0181283 | A1 * | 8/2006 | Wajcer | H04B 3/46 324/539 |
| 2009/0049937 | A1 * | 2/2009 | Diab | H04B 3/46 73/866.1 |
| 2010/0164505 | A1 * | 7/2010 | Breed | G01R 31/021 324/533 |
| 2010/0259244 | A1 | 10/2010 | Lin et al. | |
| 2010/0262850 | A1 * | 10/2010 | Lin | H04L 43/0817 713/320 |

FOREIGN PATENT DOCUMENTS

| | | | |
|---|---|---|---|
| GB | 2435358 A | | 8/2007 |
| JP | 2003106804 A | * | 4/2003 |
| JP | 2003106804 A | * | 4/2003 |
| JP | 2003106804 A | | 4/2003 |
| KR | 20100077494 A | | 7/2010 |

OTHER PUBLICATIONS

International Search Report and Written Opinion—PCT/CN2012/085619—ISA/EPO—Mar. 7, 2013.

Li, B., "Study on Wire-cable Length Precision Measurement Technology Base on TDPR", Chinese Master's Theses Full-text Database Engineering Science and Technology II, Dec. 15, 2010(Dec. 15, 2010), C042-3 chapter 2, ISSN 1674-0246 CN 11-9144/G.

* cited by examiner

CABLE LENGTH DETERMINATION USING VARIABLE-WIDTH PULSES

TECHNICAL FIELD

The present embodiments relate generally to communication systems, and specifically to communications over cables, such as twisted-pair cables.

BACKGROUND OF RELATED ART

Parameters relating to signal transmission or reception may be adjusted based on the length of the cable over which signals are transmitted. An electronic device may estimate the length of a cable to which it is coupled and adjust signal transmission and/or reception parameters accordingly. Cable length estimation presents significant challenges, however. For example, the results of an automatic gain controller (AGC) in a transceiver of the electronic device may be used to estimate cable length, but such estimates have low precision. Reflections from a pulse (e.g., a Fast Link Pulse as defined in the IEEE 802.3 family of standards) may be used to estimate cable length, but the pulse width limits the precision of the estimate. A narrow pulse, however, may not provide an adequate reflection to measure the length of a long cable.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Embodiments are disclosed in which variable-width pulses are used to determine the length of a cable.

In some embodiments, a method of determining the length of a cable coupled to a transceiver of a network device includes transmitting a first series of pulses of a first pulse width onto a cable, receiving reflections of the first series of pulses, transmitting a second series of pulses of a second pulse width onto the cable, and receiving reflections of the second series of pulses. The second pulse width is wider than the first pulse width. It is determined whether the reflections of the first series of pulses satisfy a criterion. The length of the cable is calculated using either the reflections of the first series of pulses or the reflections of the second series of pulses, based at least in part on whether the reflections of the first series of pulses satisfy the criterion.

In some embodiments, an electronic device includes a network connection to couple to a cable, a transmitter to transmit onto the cable a first series of pulses of a first pulse width and a second series of pulses of a second pulse width, and a receiver to receive reflections of the first series of pulses and the second series of pulses. The second pulse width is wider than the first pulse width. The electronic device also includes a reflection analyzer to determine whether the reflections of the first series of pulses satisfy a criterion and to calculate the length of the cable using either the reflections of the first series of pulses or the reflections of the second series of pulses, based at least in part on whether the reflections of the first series of pulses satisfy the criterion.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
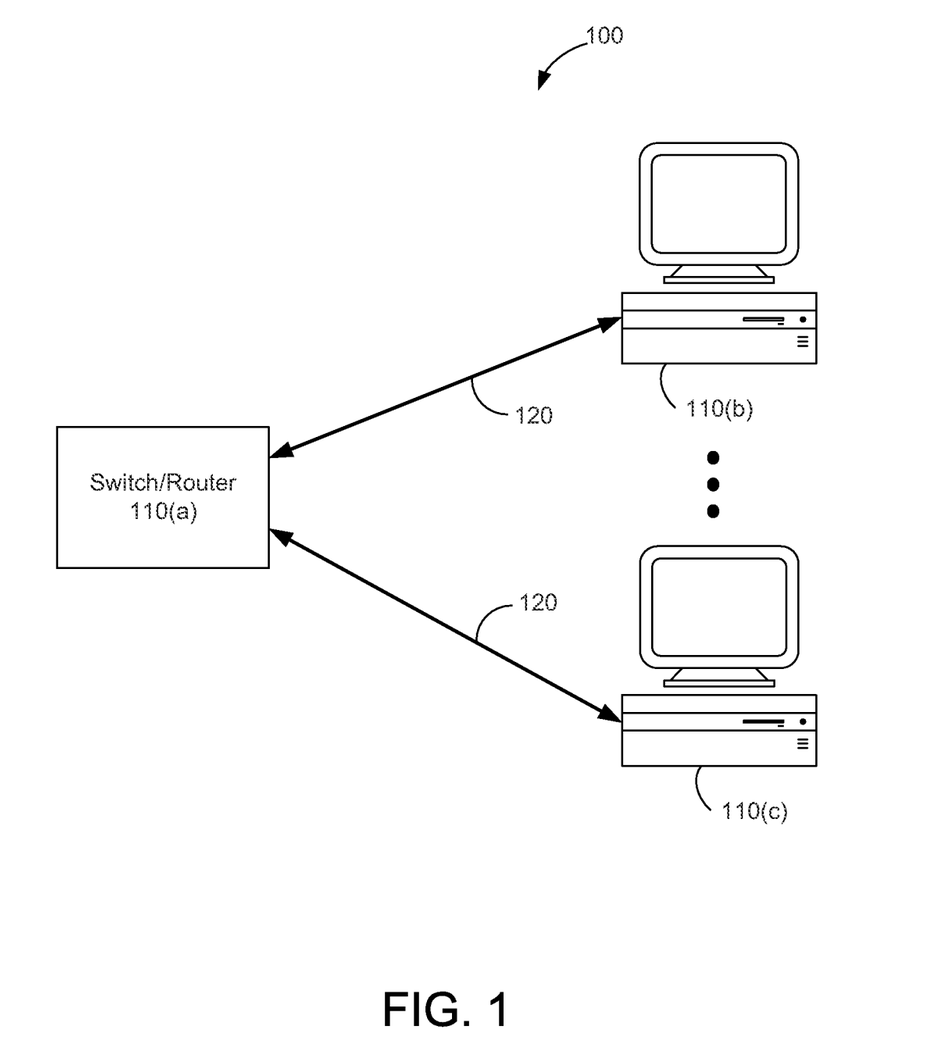
FIG. 1 is a block diagram of a communication system within which some embodiments may be implemented.

FIG. 1 is a block diagram of an exemplary communication system 100 within which some embodiments may be implemented. Communication system 100 includes a network device (e.g., a switch or router) 110($a$) coupled to a plurality of network devices 110($b$) and 110($c$) via respective data links 120. Network devices 110($b$) and 110($c$) may exchange data with the switch/router 110($a$) (and thus with each other) through respective data links 120. Network devices 110($b$) and 110($c$) may be any suitable network-enabled electronic devices including, for example, computers, switches, routers, hubs, gateways, access points, or the like.

In some embodiments, network devices 110($a$)-110($c$) communicate with each other using Ethernet technologies, as described in the IEEE 802.3 family of standards. For example, network devices 110($a$)-110($c$) are each equipped with Ethernet-compliant transceivers (not shown in FIG. 1 for simplicity) that are capable of transmitting and receiving data packets at speeds of 10 Mbit/s, 100 Mbit/s, and/or 1 Gbit/s or more.

Data links 120 are cables, such as twisted-pair cables. In some embodiments, a twisted-pair cable includes a plurality of pairs of wires, with the two wires of each pair twisted about each other; each such pair is referred to as a twisted pair and can convey a differential signal. For example, a Category 5 ("Cat 5") twisted-pair cable typically includes four twisted pairs: pair0, pair1, pair2, and pair3. Twisted pairs may be unshielded or shielded. Each of the devices 110(a), 110(b), and 110(c) includes one or more connectors to connect to respective cables. An example of a connector is the RJ-45 modular connector, which connects to Cat 5 and Cat 5e ("enhanced") cables.

In some embodiments, a first device (e.g., device 110(b) or 110(c)) transmits signals to a second device (e.g., device 110(a)) using a first twisted pair in a cable and receives signals from the second device using a second twisted pair in the cable. The first and second devices may perform an auto-negotiation process (e.g., as describe below with regard to FIGS. 4 and 5) to determine which device transmits on which pair. For example, as a result of the auto-negotiation process, a transceiver of the first device is configured in a medium dependent interface (MDI) configuration in which it transmits on pair 3 and receives on pair 2, and a transceiver of the second device is configured in a medium dependent interface crossover (MDI-X) configuration in which it transmits on pair 2 and receives on pair 3. Alternatively, the transceiver of the first device is configured in the MDI-X configuration and the transceiver of the second device is configured in the MDI configuration.

One or more (e.g., each) of the devices 110(a)-110(c) is configured to calculate the cable length of a data link 120 by transmitting a pulse (or series of pulses) onto the cable, detecting a pulse reflection from the far end of the cable, and converting a delay time associated with the reflection into an estimated cable length. In some embodiments, one or more (e.g., each) of the devices 110(a)-110(c) is configured to transmit variable-length pulses. For example, a device transmits a series of narrow pulses and looks for the reflections from the far end of the cable. If the reflections are not sufficiently distinct (e.g., are too attenuated, as determined for example by integrating the reflections and comparing a result of the integration to a threshold) to allow the cable length to be calculated, however, then the device transmits a series of wider pulses, looks for the reflections of the wider pulses from the far end of the cable, and attempts to calculate the cable length based on the reflections of the wider pulse. (Alternatively, both a series of narrow pulses and a series of wider pulses are sent and the device later determines which to use to calculate the cable length.)

Figure 2A:
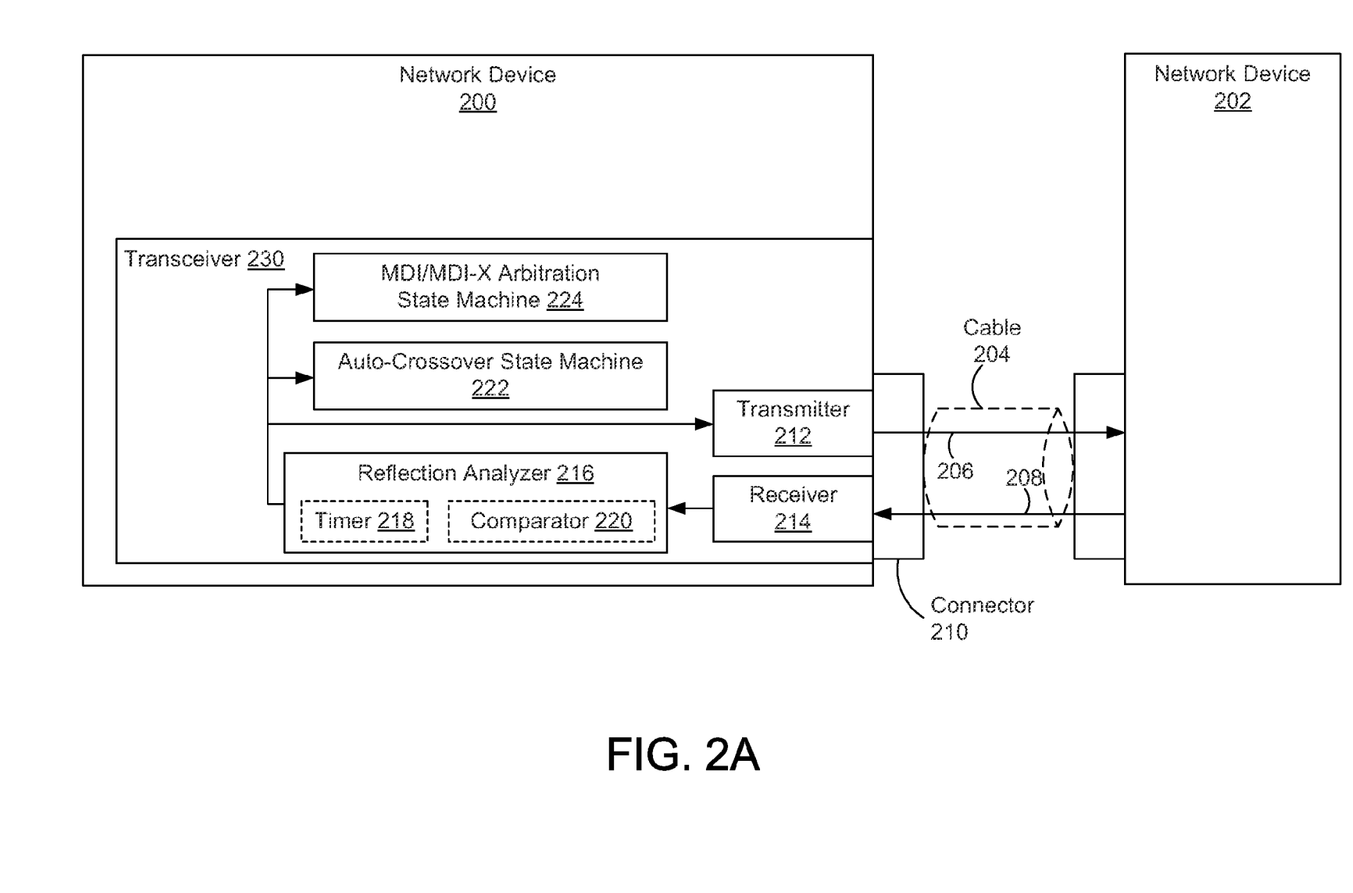
FIGS. 2A and 2B are schematic block diagrams of a network device coupled to another network device by a cable and configured to estimate cable length based on variable-width pulse reflections, in accordance with some embodiments.

FIG. 2A is a schematic block diagram of a network device 200 coupled to another network device 202 by a cable 204 in accordance with some embodiments. The network device 200 is configured to estimate the length of the cable 204 based on reflections from variable-width pulses. The network device 200 may be an example of one of the devices 110(a)-110(c) of FIG. 1. The cable 204 may be an example of a data link 120 (FIG. 1). The network device 202 is sometimes referred to as the link partner of the device 200, since it is at the other end of the link provided by the cable 204.

In some embodiments, the cable 204 includes multiple pairs of wires (e.g., multiple twisted pairs), including a first pair 206 and a second pair 208. For example, the cable 204 is a Cat 5 or Cat 5e cable, the first pair 206 is pair 3, and the second pair 208 is pair 2. In this example, FIG. 2A illustrates the device 200 in MDI configuration: a transmitter 212 transmits signals onto pair 3 206 and a receiver 214 receives signals from pair 2 208. Also in this example, the device 202 is in MDI-X configuration: a transmitter (not shown) in the device 202 transmits signals onto pair 2 208 and a receiver (not shown) in the device 202 receives signals from pair 3 206. A connector 210 (e.g., an RJ-45 connector) connects the transmitter 212 and receiver 214 to the pairs 206 and 208, and thus functions as a network connection. In some embodiments, the transmitter 212 is configurable to be connected to either of the pairs 206 and 208, as is the receiver 214. The transceiver 230 that includes the transmitter 212 and receiver 214 thus is configurable to be in either MDI or MDI-X mode. This configuration may be performed using an auto-negotiation process implemented by the state machines 222 and 224, as described further below.

In some embodiments, the transceiver 230 is an Ethernet-compatible physical-layer device.

Figure 3A:
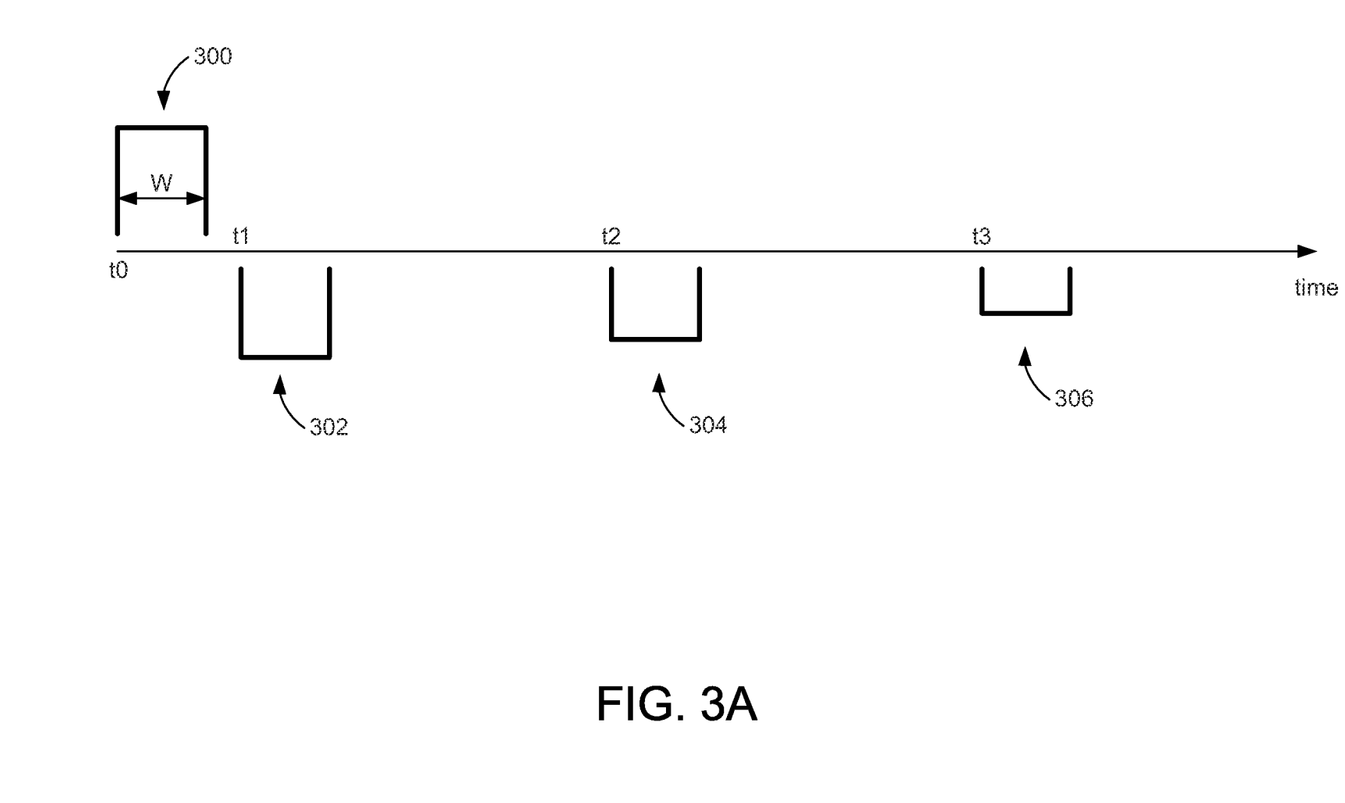
FIG. 3A is a timeline illustrating a transmitted pulse and corresponding reflections in accordance with some embodiments.

In a calibration mode, the transmitter 212 is configurable to transmit pulses of different widths. The receiver 214 receives reflections of the transmitted pulses. For example, as shown in FIG. 3A in accordance with some embodiments, a pulse 300 with a width W is transmitted starting at a time t0. (Alternatively, a series of pulses 300 each of width W is transmitted; for example, eight pulses 300 are transmitted.) A portion of the transmitted energy of each pulse 300 reflects off of the connector 210, resulting in a reflection 302 that is received at the receiver 214 at a time t1. The reflection 302 is referred to as a near-end echo, since it is generated at the near end of the cable 204 with respect to the device 200. The pulse 300 (or series of pulses) travels to the far end of the cable 204 (i.e., to the network device 202), where another reflection 304 is generated. The reflection 304 returns to the device 200 and is received at the receiver 214 at a time t2. The reflection 304 is referred to as a far-end echo, since it is generated from the far end of the cable 204 with respect to the device 200. An estimate of the length of the cable 204 may then be derived by subtracting the time t2 from t1 and multiplying the difference by a coefficient that depends on the properties of the cable 204 and is well-known. For example, a timer 218 in a reflection analyzer unit 216 coupled to the receiver 214 determines the time elapsed between t1 and t2.

In some embodiments, one or more intermediate reflections are generated between the connector 210 and the far end of the cable 204. For example, the cable 204 may include multiple portions, such that a reflection is generated at the joints between portions. These intermediate reflections arrive between the times t1 and t2 (i.e., between the reflections 302 and 304) and are disregarded in favor of far-end echo 304 when calculating cable length.

Additional far-end echoes that follow the initial far-end echo 304 are disregarded when estimating the cable length. For example, a portion of the far-end echo 304 reflects off the connector 210, traverses the cable 204 to the device 202, reflects off the far end of the cable 204, and returns to the receiver 214 as pulse 306 at a time t3. The pulse 306, which is an additional far-end echo, is disregarded. Additional far-end echoes may be identified by noting that the time (t3-t1) is twice the time (t2-t1).

In some embodiments, the transmitter 212 is initially configured in the calibration mode to transmit narrow pulses of a first width. Depending on the length of the cable 204, however, the resulting reflection 304 may be too attenuated to allow calculation of the cable length. To determine whether the reflection 304 is sufficient to calculate the cable length, the receiver 214 provides the reflection 304 to a comparator 220 in the reflection analyzer unit 216. The comparator 220 determines whether the reflection 304 satisfies a criterion.

Figure 2B:
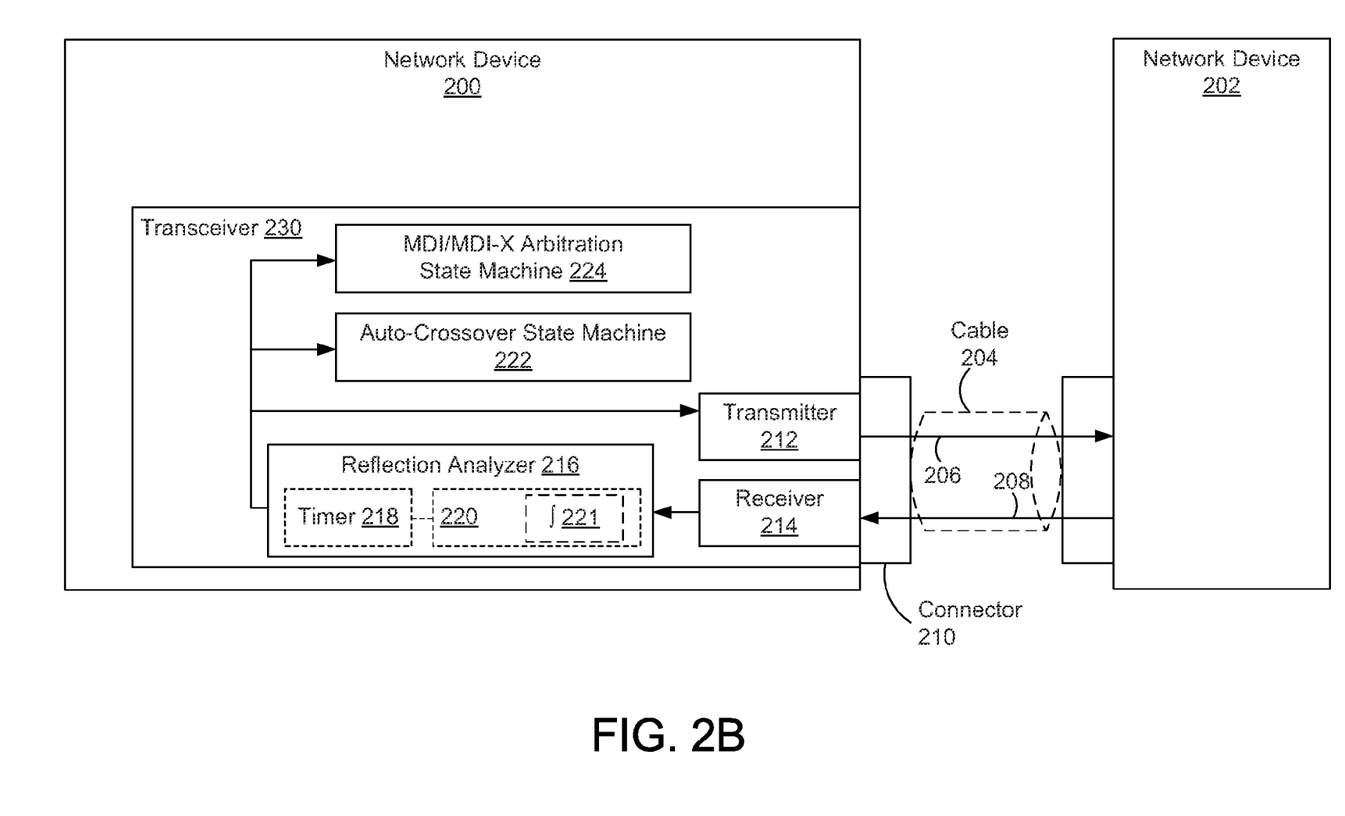

In some embodiments, the comparator 220 includes an integrator 221, as shown in FIG. 2B, to integrate the reflection 304 in accordance with some embodiments. The comparator 220 determines whether an integrated value determined by integrating the reflection 304 of the pulse (or reflections of the series of pulses) satisfies a threshold, thereby effectively determining whether the energy of the reflection 304 satisfies a threshold. Determining whether the integrated value satisfies the threshold is an example of determining whether the reflection 304 satisfies a criterion.

Figure 3B:
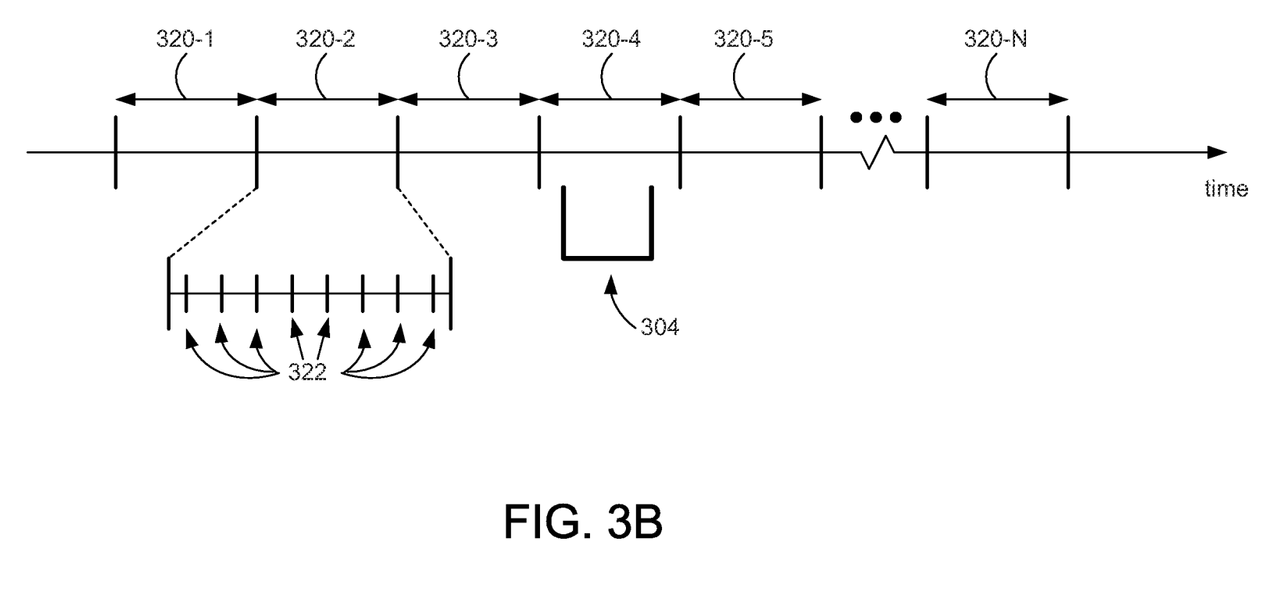
FIG. 3B is a timeline illustrating integration time segments for detecting reflections in accordance with some embodiments.

In some embodiments, a period of time that follows transmission of each pulse is divided into a plurality of time segments 320-1 through 320-N, where N is an integer greater than one, as shown in FIG. 3B in accordance with some embodiments. Each of the segments 320-1 through 320-N includes a plurality of sample points 322 (e.g., 8 sample points 322, or 16 sample points 322) at which received signals are sampled. The integrator 221 integrates samples taken at each sample point 322 within a respective segment 320 for a group of pulses, and performs this integration successively for each of the segments 320-1 through 320-N in turn for different groups of pulses. The integrator 221 thus integrates within an integration window with a duration equal to the width of each segment 320-1 through 320-N, and slides the integration window from segment to segment in turn. For example, the integrator 221 first integrates samples in the first segment 320-1, then in the second segment 320-2, then in the third segment 320-3, and so on. Reflections of a first group of pulses are sampled and the samples integrated in the first segment 320-1, reflections of a second group of pulses are sampled and the samples integrated in the second segment 320-2, and so on. The reflection analyzer 216 (FIGS. 2A-2B) determines whether any integrated values for respective sample points in the segments 320 satisfy a threshold. If an integrated value in a segment 320 satisfies the threshold, a reflection (e.g., the reflection 304, FIG. 3A) is assumed to have been received during the segment, at the time corresponding to the sample point of the integrated value. In the example of FIG. 3B, the reflection 304 is received in the fourth segment 320-4. At least one integrated value for the fourth segment 320-4 is determined to satisfy the threshold, indicating the presence of the reflection 304 in the fourth segment 320-4.

The samples taken at the sample points 322 in each segment 320 are taken at a frequency corresponding to a sampling clock running at a specified rate (e.g., 125 MHz). The granularity of the cable length measurement is a function of the sampling frequency and therefore of the number of samples per segment 320. In one example, the sampling clock frequency is 125 MHz, each sample corresponds to 0.8 meters, and each segment 320 includes 16 samples, such that each segment corresponds to approximately 13 meters. In this example, the granularity of the cable length measurement is thus approximately 0.8 meters.

If multiple sample points 322 in a segment 320 have integrated values that exceed the threshold, then the sample point 322 with the highest integration value is selected as indicating the time of receipt of the reflections and thus the cable length. Furthermore, if sample points in two adjacent segments 320 each have integrated values that exceed the threshold, which may occur when the reflection arrives partially in one segment and partially in the other, then the sample point with the highest integration value is selected as indicating the time of receipt of the reflections and thus the cable length.

In some embodiments, integration is not performed in a first portion of the segments 320-1 through 320-N, depending on the width of the pulse, to avoid overlap between the near-end and far-end echoes. For example, for a sufficiently narrow pulse (e.g., approximately 20 ns), integration is performed in all segments 320. For wider pulses (e.g., normal link pulses (NLPs) of approximately 100 ns), integration is not performed in the first few (e.g., first two or three) segments 320. The number of segments in which integration is performed may be programmable.

The number and width of the segments 320-1 through 320-N may be chosen based on the maximum anticipated cable length. In one example, a maximum cable length of approximately 200 meters is anticipated, and the time period for detecting the reflection 304 (FIG. 3A) is divided into 16 or 17 segments 320 (i.e., N=16 or 17), with each segment 320 corresponding to a cable length of approximately 12 meters. In another example, the number and width of the segments 320-1 through 320-N is also chosen based on the pulse width. For example, when transmitting narrow pulses with widths of approximately 20 ns, the segments are defined based on a maximum cable length of approximately 110 meters. When transmitting wider pulses with widths of approximately 100 ns, the segments are defined based on a maximum cable length of approximately 200 meters. Alternatively, the number and/or width of the segments 320-1 and 320-N is constant regardless of the pulse width and maximum anticipated cable length.

If far-end echo's 304 (FIG. 3A) of narrow pulses do not satisfy the criterion (e.g., no integrated value of a sample point in one of the segments 320-1 through 320-N, FIG. 3B, satisfies the threshold), the transmitter 212 is reconfigured to transmit wider pulses of a second width that is greater than the first width. (Alternatively, the transmitter 212 is reconfigured to transmit wider pulses regardless of whether or not the reflections 304 satisfy the criterion.) The reflections 304 of one or more wider pulses are then used to calculate the cable length. For example, the time of receipt of the reflection 304 of a wider pulse is subtracted from the time of receipt of the reflection 302 of the wider pulse, in the same manner as for the narrower pulse. In some embodiments, wider pulses are detected using the integrator 221 (FIG. 2B), for example in the manner described with respect to FIG. 3B. Wider pulses thus may be used to estimate the length of cables that are too long to have their lengths estimated using narrower pulses. In some embodiments, the wider pulses include one or more Fast Link Pulses (FLPs) that are each made up of a number of Normal Link Pulses (NLPs), as defined in the IEEE 802.3 family of standards, and the narrower pulses are narrower than the NLPs. FLPs are typically sufficient to allow measurement of the length of cables as long as approximately 200 m. In some embodiments, the wider pulses have widths in the range of 80-100 ns and the narrower pulses have widths in the range of 10-20 ns. For example, the narrower pulses have sufficient width to measure cable lengths of approximately 110 meters or less. In some embodiments, a first portion (e.g., the first 10 ns) of a respective narrower pulse is positive and a second portion (e.g., the second 10 ns) of the respective narrower pulse is negative. In some embodiments, the FLPs are transmitted as part of an auto-negotiation protocol.

The device 200 includes an auto-crossover state machine 222 and an MDI/MDI-X arbitration state machine 224, both of which are coupled to the transceiver 230. The state machines 222 and 224 are used to perform auto-negotiation for configuring the transceiver 230 (e.g., for configuring the transceiver 230 in MDI or MDI-X mode), as described below with regard to FIGS. 4 and 5. In some embodiments, auto-negotiation is performed using FLPs, which are made up of NLPs (e.g., 17-33 NLPs), as defined in the IEEE 802.3 family of standards. In some embodiments, the state machines 222 and 224 operate in parallel and in conjunction with each other. While the state machines 222 and 224 are shown as being separate from the transceiver 230, in some embodiments they are implemented in the transceiver 230.

Figure 4:
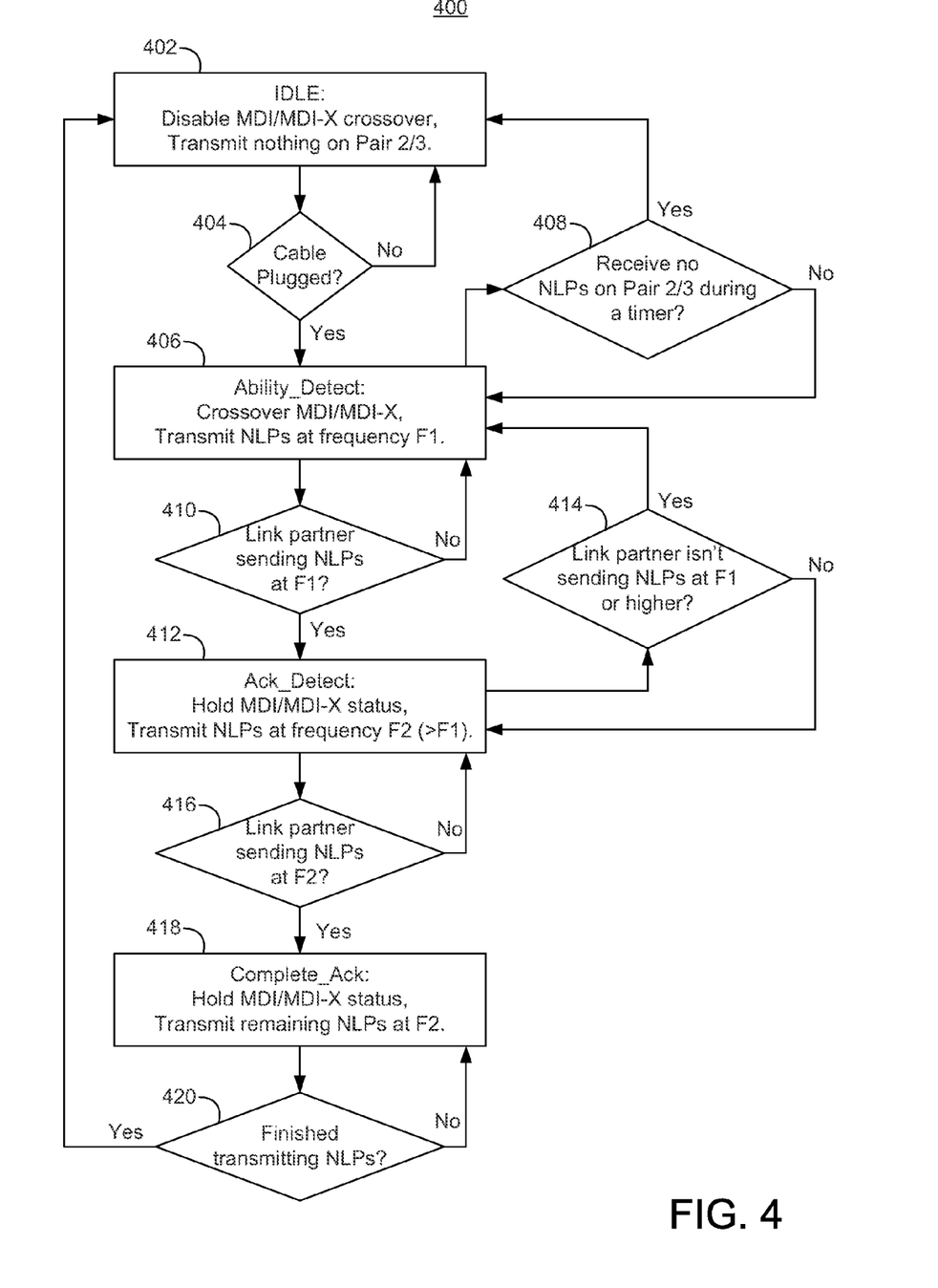
FIG. 4 is a flowchart illustrating an arbitration state diagram in accordance with some embodiments.

FIG. 4 is a flowchart illustrating an arbitration state diagram 400 corresponding to operation of the MDI/MDI-X arbitration state machine 224 (FIGS. 2A-2B) in accordance with some embodiments. In the state diagram 400, the transceiver 230 is initially in an IDLE state 402. MDI/MDI-X crossover is disabled and nothing is transmitted on either pair 2 or pair 3 of the cable 204. A determination is made (404) as to whether the cable 204 is plugged in. If the cable 204 is not plugged in (404-No), the transceiver remains in IDLE state 402. If the cable is plugged in (404-Yes), the transceiver 230 enters an Ability_Detect state 406.

Figure 5:
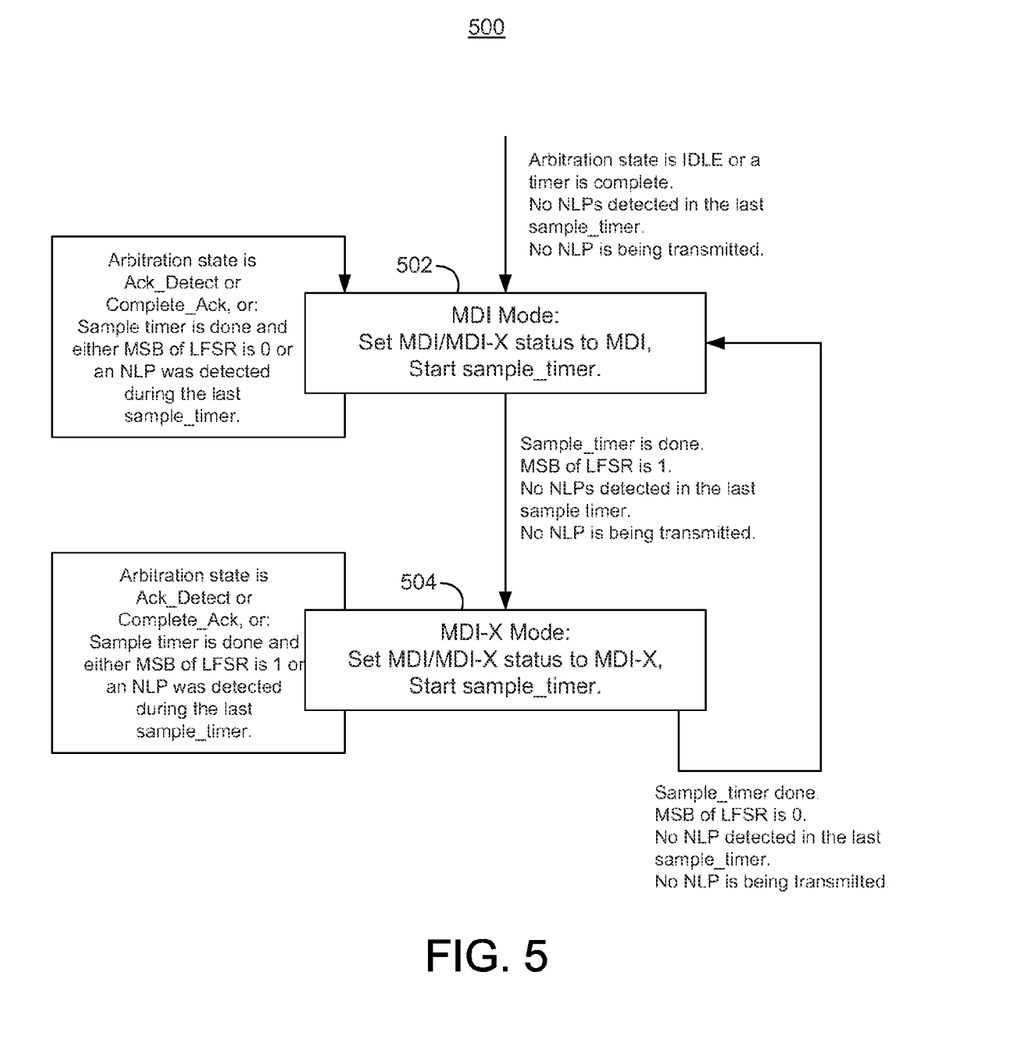
FIG. 5 is a flowchart illustrating an auto-crossover state diagram in accordance with some embodiments.

In the Ability_Detect state 406, the MDI/MDI-X configuration is crossed over: if the transceiver 230 was in MDI mode, it changes to MDI-X mode, and if it was in MDI-X mode, it changes to MDI mode. This cross-over is performed after a random timer expires. If the Ability_Detect state 406 is entered from the IDLE state 402, the transceiver 230 is put in a predefined or randomly selected configuration (e.g., MDI mode, as illustrated in FIG. 5). After crossing over its configuration, the transceiver 230 transmits pulses (e.g., NLPs) at a first frequency F1 and runs a timer. When the timer expires, a determination is made (408) as to whether NLPs were received on either pair 2 or pair 3 while the timer was running. If no NLPs were received while the timer ran (408-Yes), the transceiver 230 returns to its IDLE state 402. If pulses were received, however, (408-No), the transceiver 230 returns to Ability_Detect state 406.

A determination is made (410) as to whether a link partner is sending NLPs at the first frequency F1. If not (410-No), the transceiver 230 re-enters Ability_Detect state 406 and performs MDI/MDI-X cross-over. If so (410-Yes), the transceiver 230 transitions to Ack_Detect state 412, in which it maintains its current MDI/MDI-X configuration and transmits pulses at a second frequency F2 that is higher than F1.

A determination is made (414) as to whether the link partner is sending pulses at F1 or higher. If it isn't (414-Yes), the transceiver 230 transitions to Ability_Detect state 406. If it is (414-No), the transceiver remains in Ack_Detect state 412. A determination is made (416) as to whether the link partner is sending pulses at the second frequency F2. If it isn't (416-No), the transceiver 230 remains in Ack_Detect state 412. If it is (416-Yes), the transceiver 230 transitions to Complete_Ack state 418, in which it maintains its current MDI/MDI-X configuration and transmits pulses at the second frequency F2. In the Complete_Ack state 418, the transceiver 230 completes an acknowledgment process by transmitting a specified number of pulses at F2. If the specified number of pulses has not yet been transmitted (420-No), the transceiver 230 remains in Complete_Ack state 418 and continues to transmit. Once the specified number of pulses has been transmitted (420-Yes), the transceiver 230 returns to IDLE state 402. At this point, configuration of the transceiver 230 in either MDI or MDI-X mode is complete, bringing the auto-negotiation process to an end.

Figure 6A:
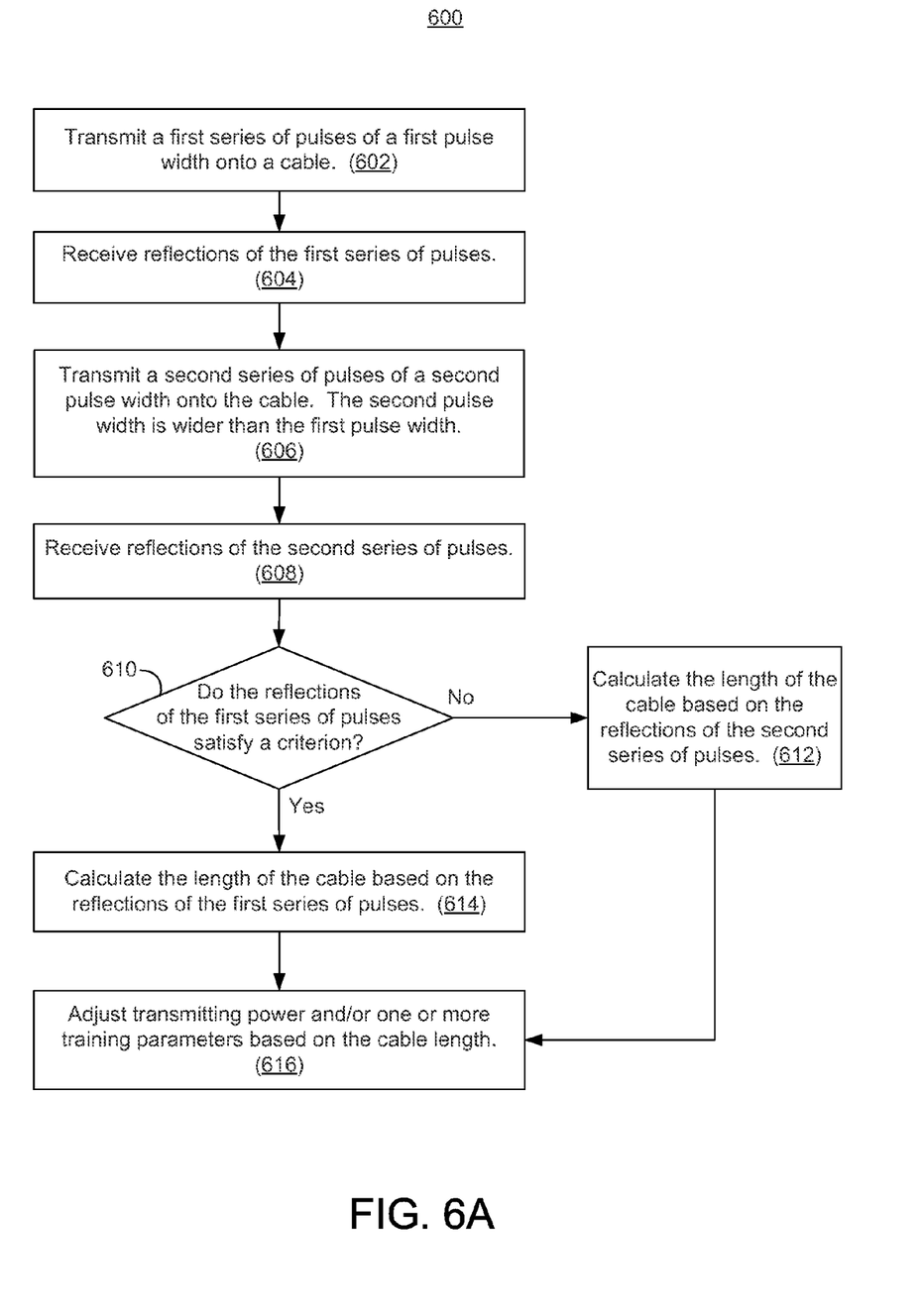
FIGS. 6A and 6B are flowcharts illustrating methods of determining cable length in accordance with some embodiments.

With the configuration determined, the transceiver 230 proceeds to estimating cable length (e.g., as described for the method 600, FIG. 6A).

FIG. 5 is a flowchart illustrating an auto-crossover state diagram 500 corresponding to operation of the auto-crossover state machine 222 (FIGS. 2A-2B) in accordance with some embodiments. If the arbitration state is IDLE (e.g., IDLE state 402, FIG. 4) or a timer (e.g., A_timer, as defined in section 40.4.5.2 of the IEEE 802.3 specification, which reduces the probability of a lock-up condition by providing for a relatively arbitrary reset of the state machine 222) is complete, and no pulses (e.g., NLPs) were detected in a previous sample timer, and no pulse (e.g., NLP) is being transmitted, then the transceiver 230 (FIGS. 2A-2B) enters MDI mode 502. The MDI/MDI-X status is set to MDI and a sample timer is started.

The transceiver 230 remains in MDI mode 502 under the following conditions: the arbitration state is Ack_Detect 412 or Complete_Ack 418 (FIG. 4), or the sample timer is done and either the most significant bit (MSB) of a linear feedback shift register (LFSR) is zero or a pulse was detected during the last sample timer. The LFSR acts as a pseudo-random number generator; IEEE 802.3 includes a definition of such an LFSR.

The transceiver 230 transitions to MDI-X mode 504 (e.g., in accordance with the Ability_Detect state 406, FIG. 4) if the sample timer is done, the MSB of the LFSR is one, no pulses were detected during the last sample timer, and no pulse is being transmitted. The MDI/MDI-X status is set to MDI-X and a sample timer is started.

Once in MDI-X mode 504, the transceiver 230 remains in MDI-X mode 504 under the following conditions: the arbitration state is Ack_Detect 412 or Complete_Ack 418 (FIG. 4), or the sample timer is done and either the most significant bit (MSB) of the LFSR is one or a pulse was detected during the last sample timer. The transceiver transitions back to MDI mode 502 (e.g., in accordance with the Ability_Detect state 406, FIG. 4) if the sample timer is done, the MSB of the LFSR is zero, no pulses were detected during the last sample timer, and no pulse is being transmitted.

The auto-crossover state diagram 500 thus allows the transceiver to change between MDI and MDI-X modes during an auto-negotiation process.

FIG. 6A is a flowchart illustrating a method 600 of determining cable length in accordance with some embodiments. The method 600 is performed, for example, by a network device 200 (FIGS. 2A-2B).

In the method 600, a first series of pulses of a first pulse width is transmitted (602) onto a cable (e.g., cable 204, FIGS. 2A-2B, which may be a twisted pair cable). For example, the transmitter 212 (FIGS. 2A-2B) transmits the first series of pulses.

Reflections (e.g., far-end echoes) of the first series of pulses are received (604). For example, reflections 304 (FIG. 3A) are received at the receiver 214 (FIGS. 2A-2B).

A second series of pulses of a second pulse width is transmitted (606) onto the cable. The second pulse width is wider than the first pulse width. Reflections (e.g., far-end echoes) of the second series of pulses are received (608). For example, reflections 304 (FIG. 3A) are received at the receiver 214 (FIGS. 2A-2B).

A determination is made (610) as to whether the reflections of the first series of pulses satisfy a criterion. In some embodiments, determining whether the reflections satisfy the criterion includes comparing an energy of the reflections to a threshold. In some embodiments, determining whether the reflections satisfy the criterion includes integrating samples of the reflections taken at respective sample points and comparing results of the integration to a threshold. This comparison is performed, for example, by comparator 220 (FIGS. 2A-2B).

If the reflection satisfies the criterion (610-Yes), the length of the cable is calculated (614) based on the reflections of the first series of pulses. For example, the reflections are far-end echoes, and the times of receipt of respective near-end echoes (e.g., reflections 302, FIG. 3A) of the first series of pulses is subtracted from the times of receipt of the far-end echoes to calculate the cable length.

If the reflections of the first series of pulses do not satisfy the criterion (610-No), the length of the cable is calculated (612) based on the reflections of the second series of pulses (e.g., based on times of receipt of far-end echoes and corresponding near-end echoes).

In some embodiments, transmitting power of the transmitter 212 is adjusted (616) based on the cable length. Data is then transmitted across the cable at the adjusted transmitting power. Adjusting transmitting power based on the cable length saves power by avoiding the use of excessive transmitting power for cables of a given length.

In some embodiments, one or more transceiver training parameters is adjusted (616) based on the cable length. In one example, a threshold for mean-squared error that is used in calibrating the transceiver 230 is adjusted based on the cable length. In another example, an initial state of a decision feedback equalizer (DFE) in the receiver 214 is adjusted based on the cable length. In still another example, the cable length is used for pre-cursor training.

In some embodiments, the cable comprises a plurality of twisted pairs. Prior to transmitting the first series of pulses, a respective pair of the plurality of twisted pairs is selected for transmission. If the reflections of the first series of pulses do not satisfy the criterion, the second series of pulses is also transmitted on the selected pair. Alternatively, the second series of pulses is transmitted on a different pair. In some embodiments, selecting the respective pair includes implementing an MDI/MDI-X arbitration strategy (e.g., as described in the arbitration state diagram 400, FIG. 4).

The method 600 thus provides a reliable, high-precision way to determine cable length and use the cable length to improve or optimize data transmission and/or reception.

While the method 600 includes a number of operations that appear to occur in a specific order, it should be apparent that the method 600 can include more or fewer operations, some of which can be executed serially or in parallel. An order of two or more operations may be changed and two or more operations may be combined into a single operation. For example, the decision 610 may be moved before the operation 606, such that the operations 606 and 608 are only performed if the reflections of the first series of pulses do not satisfy the criterion.

Figure 6B:
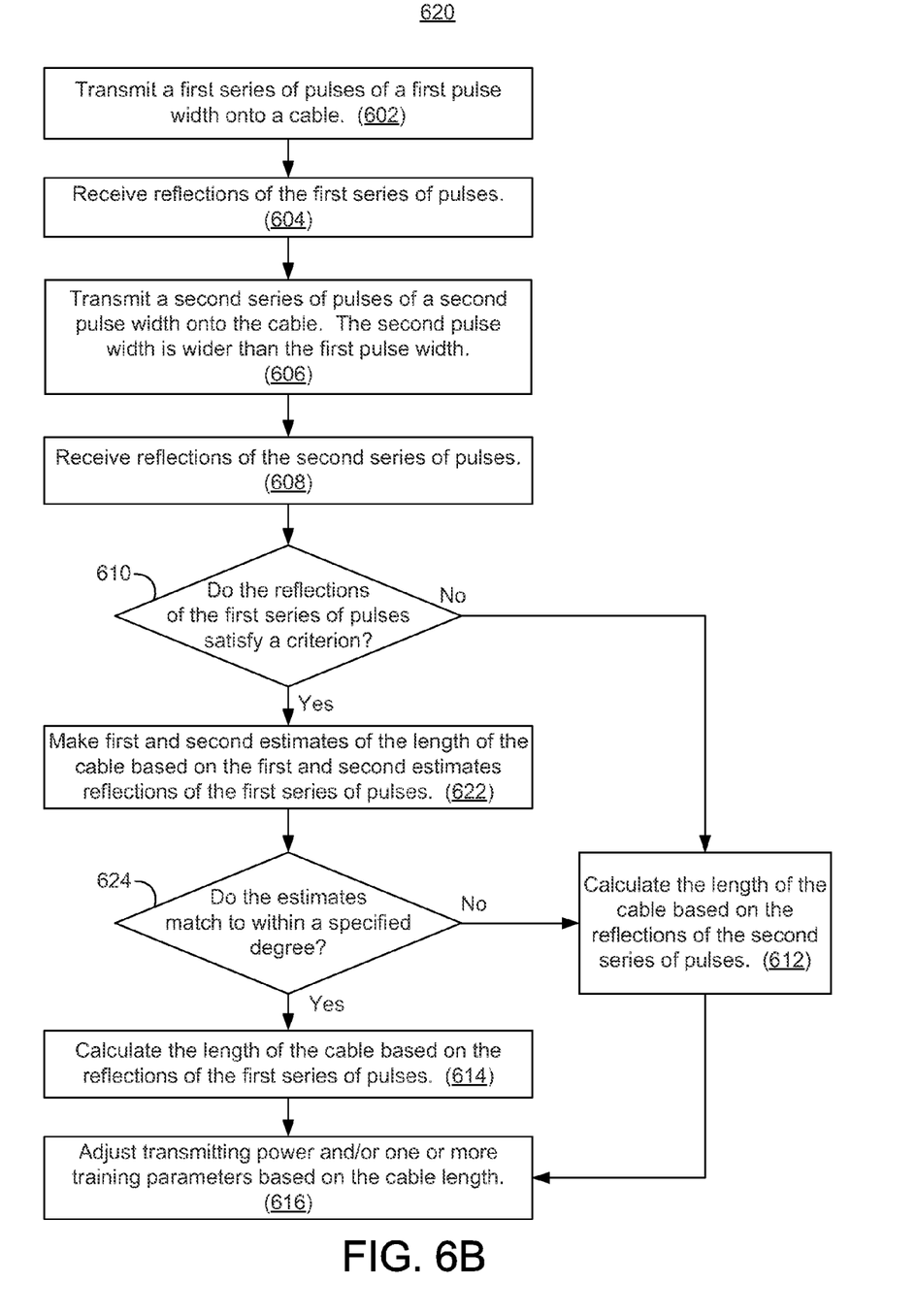

FIG. 6B is a flowchart illustrating a method 620 that corresponds to the method 600 and includes an additional factor for determining which series of pulses to use to calculate cable length, in accordance with some embodiments. The operations 602-610 are performed as described with regard to FIG. 6A. If the reflections of the first series of pulses satisfy the criterion (610-Yes), first and second estimates of the length of the cable are made (622) based on the reflections of the first and second series of pulses, respectively. A determination is made (624) as to whether the first and second estimates match to within a specified degree (e.g., to within the granularity or precision provided by the reflections of the second series of pulses). If the estimates match (624-Yes), the length of the cable is calculated (614) based on the reflections of the first series of pulses. For example, the first estimate is used as the calculated cable length. If the estimates do not match (624-No), the length of the cable is calculated (612) based on the reflections of the second series of pulses. For example, the second estimate is used as the calculated cable length. This logic reflects the fact that the narrower pulses of the first series may provide a more precise measurement, but the wider pulses of the second series are less likely to provide a spurious result.

The operation 616 may then be performed as described for the method 600 (FIG. 6A).

Figure 6C:
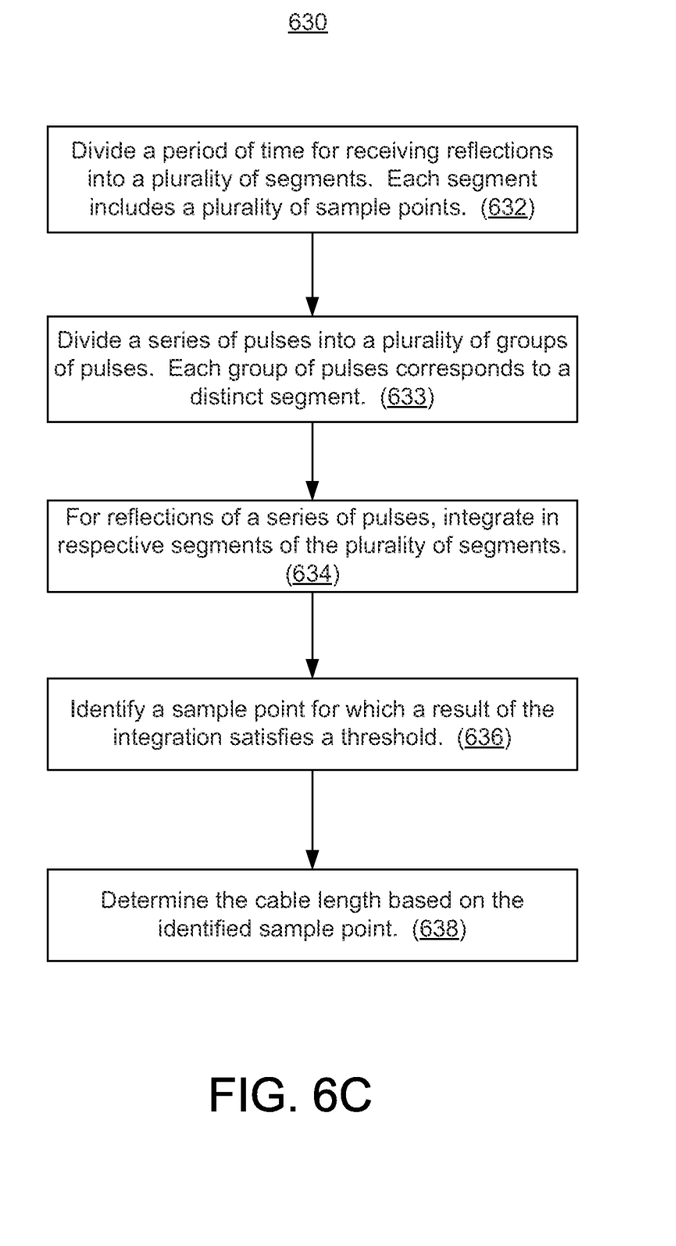
FIG. 6C is a flowchart illustrating a method of determining whether a pulse reflection satisfies a criterion in accordance with some embodiments.

FIG. 6C is a flowchart illustrating a method 630 of determining whether a pulse reflection satisfies a criterion in accordance with some embodiments. The method 630 may be performed, for example, as part of the methods 600 and/or 620 (FIGS. 6A-6B).

In the method 630, a period of time for receiving reflections is divided (632) into a plurality of segments (e.g., segments 320-1 through 320-N, FIG. 3B). Each segment includes a plurality of sample points 322 (FIG. 3B).

A series of pulses (e.g., the first series and/or the second series of the methods 600 and/or 620, FIGS. 6A-6B) is divided (633) into a plurality of groups of pulses. Each group of pulses corresponds to a distinct segment.

For each group of pulses, the reflections are integrated (634) in the corresponding segment. This integration is performed, for example, by the integrator 221 (FIG. 2B). In some embodiments, integrating the reflections of each group of pulses includes separately integrating samples for each sample point in the corresponding segment.

In one example, approximately 145 reflections of the first series of pulses are divided into groups and integrated (e.g., the first series of pulses includes 145 pulses). In another example, approximately 133 FLPs are used in the second series of pulses.

A sample point is identified (636) for which a result of the integration satisfies a threshold. The cable length is determined (638) based on the identified sample point. For example, each sample point corresponds to a different cable length, and identifying the respective segment determines the cable length. In some embodiments, if multiple sample points are identified that each have an integration result satisfying the threshold, the sample point with the greatest integration result is used to determine the cable length.

While the method 630 includes a number of operations that appear to occur in a specific order, it should be apparent that the method 630 can include more or fewer operations, some of which can be executed serially or in parallel. An order of two or more operations may be changed and two or more operations may be combined into a single operation.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of determining a cable length, comprising:
   in a network device comprising a transceiver:
   transmitting a first series of pulses of a first pulse width onto a cable;
   receiving reflections of the first series of pulses, the receiving comprising:

dividing a period of time for receiving the reflections of the first series of pulses into a plurality of segments;
dividing the first series of pulses into a plurality of groups of pulses, each corresponding to a distinct segment; and
integrating the reflections of each group of pulses during a corresponding segment;
transmitting a second series of pulses of a second pulse width onto the cable, wherein the second pulse width is wider than the first pulse width;
receiving reflections of the second series of pulses;
determining if the reflections of the first series of pulses satisfy a criterion; and
calculating the cable length using either the reflections of the first series of pulses or the reflections of the second series of pulses, based at least in part on the reflections of the first series of pulses satisfying the criterion.

2. The method of claim 1, wherein the calculating uses the reflections of the second series of pulses when the reflections of the first series of pulses do not satisfy the criterion.

3. The method of claim 1, wherein the calculating uses the reflections of the first series of pulses when the reflections of the first series of pulses satisfy the criterion.

4. The method of claim 1, wherein, when the reflections of the first series of pulses satisfy the criterion, the calculating comprises:
making first and second estimates of the length of the cable based respectively on the reflections of the first and second series of pulses;
determining whether the first and second estimates match to within a specified degree;
if the first and second estimates match to within the specified degree, selecting the first estimate; and
if the first and second estimates do not match to within the specified degree, selecting the second estimate.

5. The method of claim 1, wherein the second series of pulses comprises a fast-link pulse transmitted during an auto-negotiation procedure.

6. The method of claim 1, wherein determining if the reflections of the first series of pulses satisfy the criterion comprises comparing results of the integrating for respective segments to a threshold.

7. The method of claim 1, wherein:
each segment of the plurality of segments comprises a plurality of sample points; and
integrating the reflections of each group of pulses comprises separately integrating samples for each sample point in the corresponding segment.

8. The method of claim 7, wherein the calculating comprises identifying a first sample point for which a result of the integrating satisfies a threshold, wherein the first sample point corresponds to a first cable length.

9. The method of claim 8, wherein the calculating further comprises:
identifying a second sample point for which a result of the integrating satisfies the threshold, wherein the second sample point is adjacent to the first sample point and corresponds to a second cable length; and
determining the greater of the integration result for the first sample point and the integration result for the second sample point.

10. The method of claim 1, wherein receiving the reflections of the first series of pulses comprises:
determining if respective reflections are initial far-end echoes; and
discarding respective reflections determined not to be initial far-end echoes.

11. The method of claim 1, further comprising:
adjusting transmitting power of the transceiver based on the calculated cable length; and
transmitting data across the cable at the adjusted transmitting power.

12. The method of claim 1, further comprising adjusting one or more training parameters of the transceiver based on the calculated cable length.

13. A method of determining a cable length, comprising:
in a network device comprising a transceiver:
transmitting a first series of pulses of a first pulse width onto a cable;
receiving reflections of the first series of pulses;
transmitting a second series of pulses of a second pulse width onto the cable, wherein the second pulse width is wider than the first pulse width;
receiving reflections of the second series of pulses, the receiving comprising:
dividing a period of time for receiving the reflections of the second series of pulses into a plurality of segments;
dividing the second series of pulses into a plurality of groups of pulses, each corresponding to a distinct segment; and
integrating the reflections of each group of pulses during a corresponding segment
determining if the reflections of the first series of pulses satisfy a criterion; and
calculating the cable length using either the reflections of the first series of pulses or the reflections of the second series of pulses, based at least in part on the reflections of the first series of pulses satisfying the criterion.

14. The method of claim 13, wherein:
each segment of the plurality of segments comprises a plurality of sample points; and
integrating the reflections of each group of pulses comprises separately integrating samples for each sample point in the corresponding segment.

15. The method of claim 14, wherein the calculating comprises identifying a first sample point for which a result of the integrating satisfies a threshold, wherein the first sample point corresponds to a cable length.

16. A method of determining a cable length comprising:
in a network device comprising a transceiver:
transmitting a first series of pulses of a first pulse width onto a cable, wherein the cable is a twisted-pair cable comprising a first group of twisted pairs and a second group of twisted pairs;
receiving reflections of the first series of pulses, wherein transmitting the first series of pulses and receiving the reflections of the first series of pulses is performed on the first group of twisted pairs;
transmitting a second series of pulses of a second pulse width onto the cable wherein the second pulse width is wider than the first pulse width;
receiving reflections of the second series of pulses, wherein transmitting the second series of pulses and receiving the reflections of the second series of pulses is performed on the second group of twisted pairs;
determining if the reflections of the first series of pulses satisfy a criterion; and
calculating the cable length using either the reflections of the first series of pulses or the reflections of the second series of pulses, based at least in part on the reflections of the first series of pulses satisfying the criterion.

17. The method of claim 16, further comprising, prior to transmitting the first series of pulses, selecting a twisted pair of the first group on which to transmit the first series of pulses.

18. The method of claim 17, wherein the selecting comprises implementing an MDI/MDI-X arbitration strategy.

* * * * *